Patented May 23, 1933

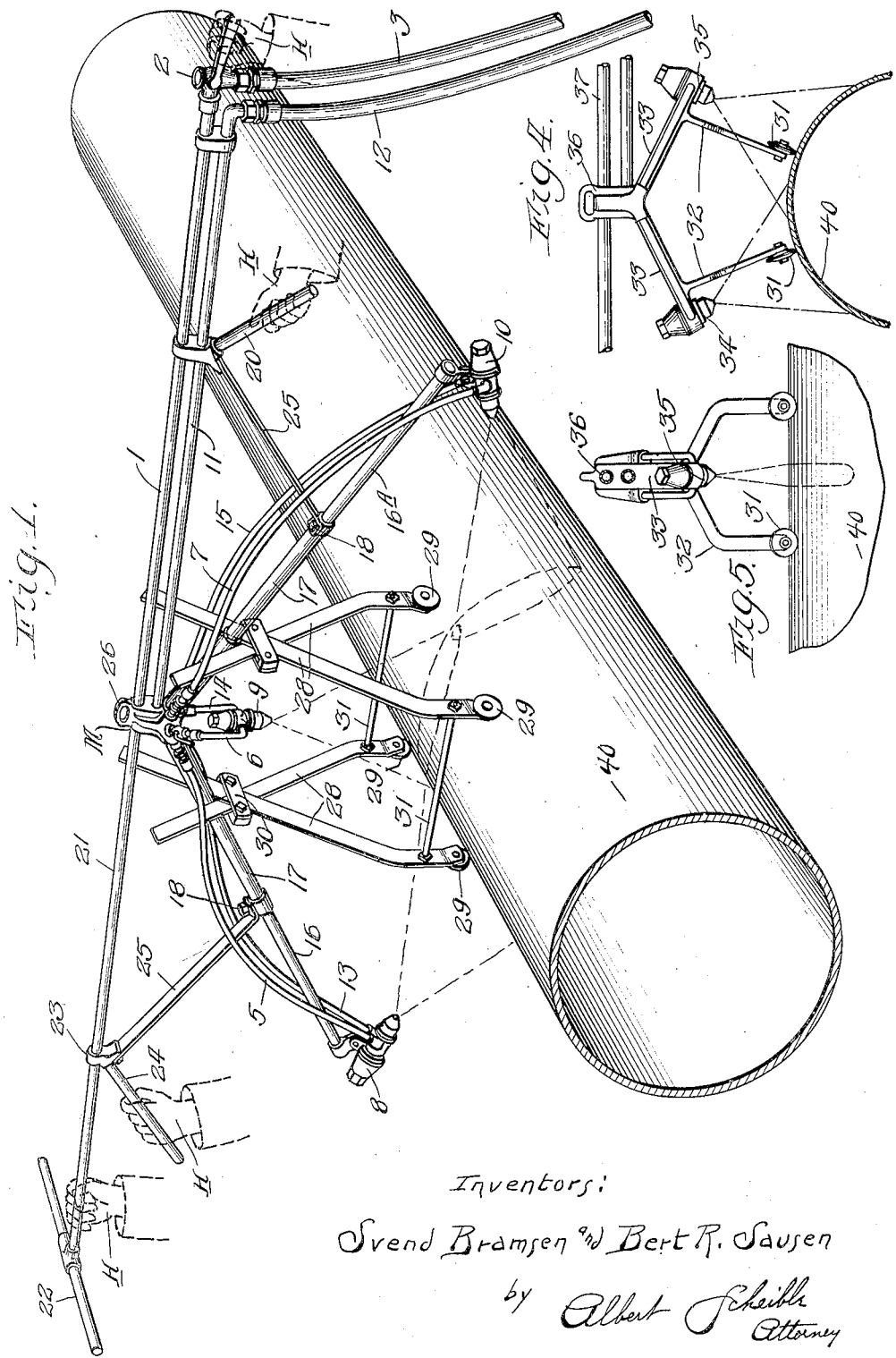

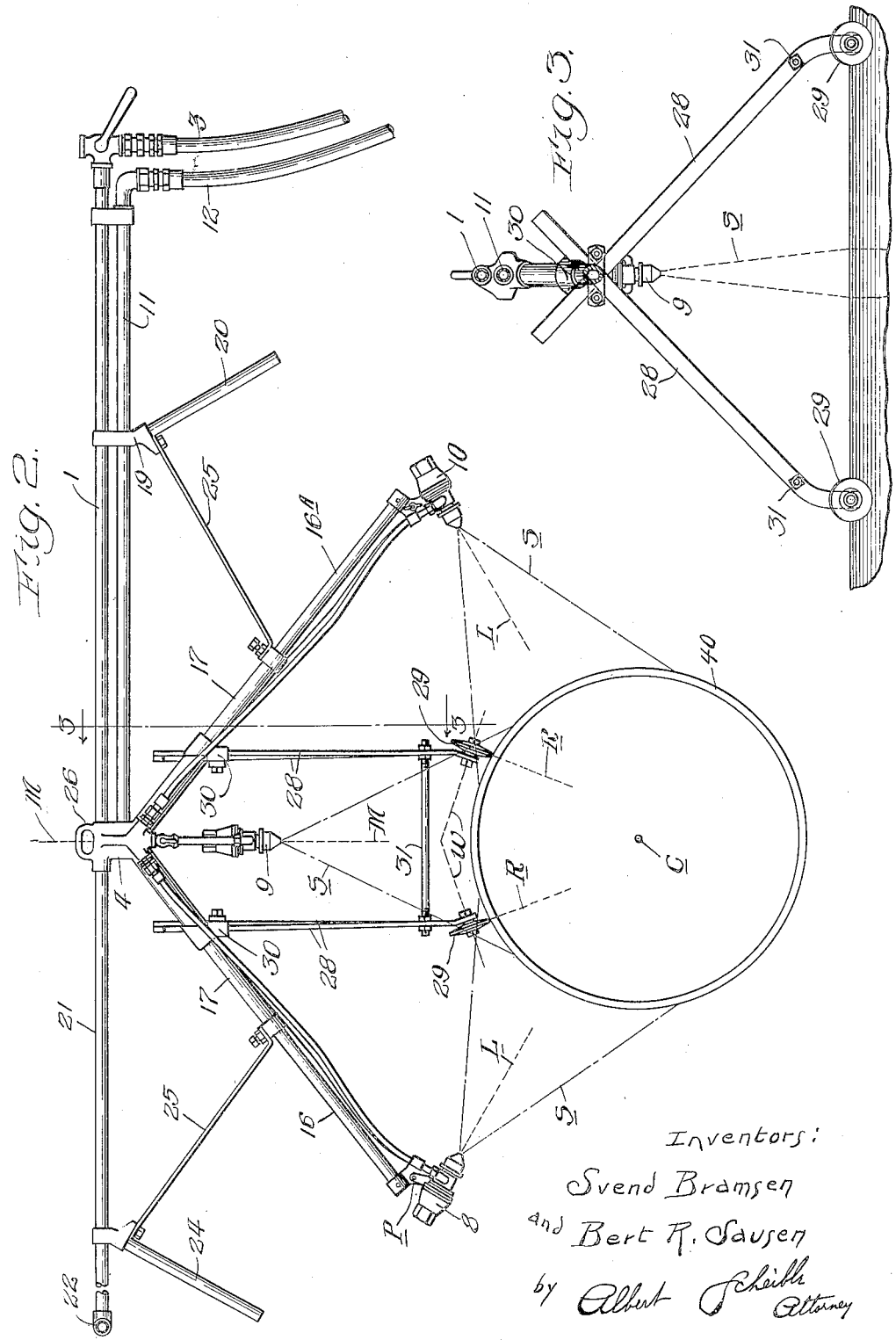

1,910,674

UNITED STATES PATENT OFFICE

SVEND BRAMSEN, OF CHICAGO, AND BERT R. SAUSEN, OF OAK PARK, ILLINOIS, ASSIGNORS TO BINKS MANUFACTURING COMPANY, OF CHICAGO, ILLINOIS, A CORPORATION OF DELAWARE

METHOD OF SPRAYING PIPES

Application filed February 14, 1931. Serial No. 515,704.

Our invention relates to the surface-coating of objects which have a substantially uniform cross-section throughout their length, as for example large diametered pipes.

Generally speaking, the object of our invention is the providing of a method whereby a liquid coating material may easily and speedily be applied for the full length of such an object and with substantial uniformity over a considerable portion of the periphery of a pipe, or of any other object of the same general exterior shape.

More particularly, our invention aims to provide an expeditious method of simultaneously applying a liquid coating material to a plurality of laterally adjacent surface portions of an exteriorly cylindrical object in such a manner as to deposit a coating of approximate uniformity over a considerable peripheral portion of the object for the entire length of that object, so that the entire exterior surface of that object can be coated with relatively few applications of the coating material.

Still further and also more detailed objects of our invention will appear from the following specification and from the accompanying drawings, in which Fig. 1 is a perspective view, showing a spraying apparatus as it appears during the surface-coating of a pipe according to the method of our invention, with dotted lines showing the extent to which the coating material is being applied at a given moment to laterally adjacent portions of the pipe, and with other dotted lines showing the hands and parts of the sleeves of two men manipulating the apparatus.

Fig. 2 is an enlarged end view of the same pipe and pipe-spraying apparatus.

Fig. 3 is a vertical section taken parallel to the axis of the pipe along the line 3—3 of Fig. 2.

Fig. 4 is a fragmentary end view of a simplified two-spray apparatus for employing our invention, with the ducts for the liquid material and the compressed air omitted.

Fig. 5 is a side elevation of the same simplified apparatus, looking toward the left from the right-hand side of Fig. 4.

In conveying natural gas from the gas wells to distant cities on a large scale, it has been found economical to employ steel piping of relatively large diameter, as for example 16 inch piping, and it is imperative that the piping should have a protective coating both on its interior and its exterior surfaces to guard against corrosion of the steel. In practice, the interior coating can readily be applied at the steel mill before the piping is shipped from the mill, since this inner coating is not exposed to contact with objects which might scratch or otherwise mar it.

However, any exterior coating applied to the pipes before shipping the pipe would be badly marred, before it reaches the ground at its destination, by the tools used in loading and unloading it, and also by the jarring and rubbing of the pipes against one another and against adjacent objects while on the cars and on the delivery trucks. Consequently, it has been found necessary to have the exterior coating applied to each length of pipe after this pipe has been unloaded from the delivery truck adjacent to the trench in which the pipe is to be laid.

For this purpose, hand painting would require an undesirably long time and would involve a commercially prohibitive cost for the labor, in addition to producing a coating of such a variable density as to require a considerable excess of coating material on some portions of the pipe to assure a given minimum density of the coating on the entire surface of the pipe.

Attempts at surface-coating such pipes by applying the material with a hand-held spray gun, after the customary manner of spray-painting flat surfaces, have also proven unsatisfactory for these reasons:

(1) Even an expert (and correspondingly highly paid) spray painter has difficulty in holding a spray gun continuously at a uniform distance from the surface against which the spray is directed, when he is walking on a level floor and when the coating liquid is of low weight—as is usually true of the coating materials applied to automobile bodies or the like. When the coating material contains heavy ingredients, such as asphalt, so as to be suitable for an inexpensive protection of piping against corrosion in the ground, the increased weight of this material in the portion of the hose which leads to the spray gun and which must be supported by the user of the gun will speedily tire him, so as to reduce the number of daily hours during which he can guide this gun with even an approximately uniform spacing of the gun from the piping.

(2) No two men will agree as to judging the distance of the spray gun from the surface which is to be coated, or in judging the width and position of the longitudinal stripe applied to a pipe by a hand-held spray gun, and these estimates will also vary for the same man during different parts of a given working day. Consequently, both the lateral extent to which the coating material is applied during each pass of the spray gun longitudinally of the pipe and the density of the resulting coating will vary considerably, so that an excessively thick coating will be required on some parts of the pipe in order that all portions shall have the required thickness of this coating.

(3) When the spray-painting is to be done after the pipe is unloaded alongside the trench for it, the ground adjacent to the pipe is usually uneven; and no one can at the same time look where he steps, and also carefully watch both the direction of the spray from a gun held by him and the distance of the gun from the pipe. Consequently, a considerable wavering of the user of a hand-held spray gun is inevitable under such conditions, and when the user is on rough ground he may even move his hand to such an extent that the spray will not strike the pipe at all and will again need to be directed toward the skipped portion of the pipe.

(4) Owing to the convexity of the exterior of any cylindrical object, the width of the longitudinal stripe of coating material which can be applied by means of a single spray gun is limited, and this width is further limited for many coating materials by the restricted distance from which the spray must be projected to produce the proper coating. Consequently, the spray-coating of large diametered pipes if produced by successive single-spray stripes would involve an undesirable amount of time and of expense for the labor.

Our present invention overcomes all of the above recited objections to the methods heretofore in use by providing a pipe coating method which will enable the coating to be applied to the pipe in the form of longitudinal stripes of uniformly maintained widths, relative locations, and densities by the simultaneous projection of a corresponding number of sprays of the liquid coating material against the pipe; and which will permit this simultaneous multiple-striping of the pipe to be accomplished without depending on the judgment of the men employed for effecting the same, without unduly tiring these men, and while permitting these men to watch their steps adequately when walking on uneven ground or on ground interrupted by stones, stubble or the like.

In operating according to our here presented method, we desirably employ the apparatus more fully disclosed in the drawings, although we do not wish to be limited as to the apparatus employed for operating according to the here disclosed method, nor to the hereafter described manipulation of such apparatus except in so far as this manipulation is within the scope of the appended claims.

In Figs. 1 to 3, the illustrated triple-stripe spray apparatus includes a horizontal air pipe 1 connected at its outer end through a three-way valve 2 to an air supply hose 3, to which compressed air is supplied. The air pipe 1 is supported from its inner end by a connecting member 4 provided with passages leading to three air distribution ducts 5, 6 and 7 which respectively lead to three spray appliances 8, 9 and 10.

Extending alongside the air pipe 1, and here shown as below the latter, is a material pipe 11 to which the liquid coating material is supplied by a material hose 12. The inner end of this material pipe 11 is also fastened to the connecting member 4, and passages within that member connect the material pipe to material ducts 13, 14 and 15 which lead respectively to the three spray appliances 8, 9 and 10, as disclosed more fully in our said copending application.

The central spray appliance 9 is rigidly supported by the ducts 6 and 14, while each of the other two spray appliances 8 and 10 is supported by the outer end portion of one of two adjustable arms 16 and 16A. Each of these arms forms an extension of one of two arm-supporting tubes 17 which are fastened to the connecting member 4 and which have their axes in a common vertical plane M with the axis of the air duct 1. These arm-supporting tubes diverge downwardly at equal angles from the said plane M, and the arm (16 or 16A) which extends into each tube can be clamped to the latter by a screw 18 so as to adjust the distance between the appliance-supporting outer end of each such arm from the connecting member. Moreover, each of the two outer spray appliances 8 and 10 is supported from the adjacent supporting arm by a suitable swivel connection which permits the appliance to be rocked about an axis which is parallel to the said medial plane M and at right angles to the axis of the air duct 1, as about the axis of the swiveling pin P in Fig. 2.

One of the downwardly diverging arm-supporting tubes is operatively connected to the air tube 1 by a brace 25, this brace being here shown as connected to both this air tube and the material tube 11 by a fitting 19 from which a handle 20 extends downwardly. Supported also by the connecting member and extending in alinement with the air tube 1 is a pipe 21 which has a transversely extending lifting bar 22 fastened to its outer end. This pipe 21 carries a second fitting 23 supporting a second downwardly extending handle 24, and a brace 25 rigidly connects this fitting 23 with the adjacent arm-supporting tube 17. Thus arranged, the heretofore described parts form a rigid assemblage which can be lifted and carried as a unit, and which can be suspended upon a truck from an eye 26 on the fitting 4.

To support this assemblage for use according to our method, we provide a four-wheeled carriage, here shown as including two pairs of crossed legs 28, each of which legs has a wheel 29 pivotally supported by its lower end. The two legs of each pair cross within a clamp 30 which is fastened to one of the arm-supporting tubes 17, and which clamp is constructed for holding the two crossed legs 28 substantially in a common plane parallel to the aforesaid plane M. Spacer bolts 31 connect each two laterally opposed legs 28 (as shown in Fig. 1), and the lower ends of the opposed legs are bent downwardly toward each other, so that the axes W of each two laterally opposite wheels converge upwardly, thereby causing the medial planes R of the wheels to converge downwardly.

With the legs 28 and the wheels 29 of counterpart formation, with the legs 28 adjusted so as to extend for equal distances from the adjacent clamps 30, and with these clamps at equal distances from the said medial plane M, this plane will extend through and along the axis C of the pipe 32 (which is to be sprayed) when the carriage is set down on the pipe 40 with the air duct 1 and its continuation 21 extending transversely of this pipe.

Before starting the spraying, the two lateral spray appliances 8 and 9 are adjusted so that their axes L converge toward the pipe and preferably extend radially of the pipe. The appliance-supporting arms 16 and 16A as well as the crossed carriage legs 28 are also adjusted so that the distance of the outlet of each spray appliance to the pipe, measured along the axis of each such appliance, is the same. These spray apliances are preferably counterparts of each other and constructed for projecting sprays flattened along a plane axial of the appliance, and in practice the mounting is preferably such that this flattening plane (or plane of the longer axes of the elliptical "target" of the spray) is at right angles to the axis of the pipe; and the two lateral spray appliances are adjusted so that their axes L will be at equal acute angles to the medial plane M in which the axis of the central spray appliance is disposed. Moreover, the three spray appliances are all similarly adjusted as to their emission of air and liquid material, so that when thus equally spaced from one another and all at equal distances from the axis of the pipe, the spray from each of these appliances will cover an equal peripheral portion of the pipe.

When both the compressed air and the liquid material are admitted through the hose leads 3 and 12 so as to start the simultaneous sprays from all three appliances, the entire assemblage is pushed longitudinally along the pipe. This is easily done by two men, and when these men respectively grasp portions of the structure near the outer ends of the air pipe 1 and its continuation 21, the two men can easily roll the movable spraying assemblage upon the pipe for the entire length of the pipe.

Since the forward wheels of the assemblage have their general planes R converging inwardly of the pipe, and since the same is true of the general planes of the rearward wheels, there is no tendency toward having the assemblage depart from a purely longitudinal movement, so that only a small effort is required for guiding the assemblage, in addition to the small amount of power needed for propelling it. Indeed, when one man grasps the outer portion of the guide pipe 21 with one hand H and the adjacent handle 24 with his other hand, as shown in Fig. 1, his companion can grasp the other handle 20 with one hand and with his other hand can grasp any other adjacent parts—such as a part of the control valve 2.

So also, the two men manipulating such a pipe spray device can easily lift this device bodily onto the starting end of one pipe and from the farther end of that pipe onto another pipe laid in approximate alinement with the first one, and so on. When the group of sprays has traversed the pipe or series of pipes for the entire length thereof, the wheeled carriage and spray device assemblage can be lifted off the pipe while the latter is rotated sufficiently to present an unsprayed side portion, and the said assemblage is then rolled in the reverse direction upon the piping to spray another peripheral section.

The number of longitudinal passes of such a spray device assemblage will obviously depend on the portion of the periphery of the piping which is spray-coated in a single pass. For example, when the adjustment of the parts is such that the simultaneous sprays from the several spray appliances jointly extend fully half-way circumferentially of the piping (as illustrated by the dash and dot lines S in Fig. 2, which show the spreads of the three sprays), two passes of the spray device assemblage along the piping will suffice.

However, with only two passes, it is difficult (with some coating materials) to obtain an adequately uniform distribution of the coating circumferentially of the piping, even when the thinned edge portions of adjacent sprays overlap somewhat, as shown in Fig. 2. Moreover, a two-pass spraying will always end with the spray device assemblage back at its starting point, so that this assemblage then has to be carried for the full length of the completely sprayed pipe before the spraying of the next pipe (or end-to-end group of pipes) can begin.

For the reasons just named, we preferably adjust the position of the several spray appliances for effectively covering only a third of the periphery of the piping, plus a due allowance for an overlapping of the oppositely directed lateral edges of the sprays from the two outer appliances 8 and 9, and employ three passes of our assemblage. For example, with three 30-foot pipes laid approximately end to end, our spray device assemblage is first rolled forward over all three of the approximately alined pipes. Then the assemblage is lifted off the last pipe while all three pipes (beginning with the one first sprayed) are rotated 120 degrees; whereupon the assemblage is rolled in the reverse direction for the full length of all three pipes to the initial starting point so that the third pass (made after all pipes have again been rotated another 120 degrees) will leave the apparatus at a point close to the next group of pipes.

When operating along the general manner above described, the structure which enables the wheels to support the several spray devices also cooperates with the device-supporting arms to maintain the outlet of each spray device at the initially predetermined distance from the pipe, thereby securing a maintained spread (peripherally of the pipe) by the spray from that device.

Moreover, since the spacing of the devices from each other and the relative adjustment of their axes is also maintained during this guiding from the pipe, both the total peripheral spread of the spray from the several devices and the extent to which the sprays of adjacent devices overlap are automatically maintained. Consequently, our method not only saves a large amount of time and labor over the heretofore customary methods of spray-painting pipes, but also reduces the previously customary wasting of coating material, due to an irregular and excessive overlapping of successive sprays, avoids other undue variations in coating densities, and eliminates the heretofore annoying and costly need of an additional touch-up spraying on insufficiently coated pipe portions.

However, while we have heretofore described our method as used for longitudinally striping a pipe by the simultaneous projection of three sprays maintained in certain relations to each other and to the pipe, we do not wish to be limited in this respect, nor do we wish to be limited to the use of apparatus arranged for affording the heretofore described adjustments, or otherwise limited as to employing apparatus of any particular arrangement or construction for operating according to our method.

In practice, such adjustments are desirable in the needed apparatus, both to adapt the same apparatus for use on pipes of different diameters, and also to permit its equally effective use with differing liquid coating materials or even with the same coating material at different temperatures; but such adjustability may not be required if the spray-coating is all to be done according to our method on piping of a single given diameter and with liquid coating material of a constant gravity and viscosity.

For example, Figs. 4 and 5 somewhat diagrammatically show portions of a simplified pipe spraying device, with the means for supplying both the air and the liquid coating material omitted. In this embodiment, the guide wheels 31 are pivotally mounted (in a disposition generally corresponding to that shown in Fig. 2) on the lower end portions of our legs depending from a two-armed appliance support 33. Two spray appliances 34 and 35 are mounted respectively on the opposite ends of this two-armed support with their axes converging downwardly, and the said support has an upward projection 36 supporting a horizontal guide bar 37 which has its axis in the same vertical plane with the axes of both of the spray appliances.

Moreover, it will be obvious that the number of spray devices propelled along and guided from a pipe or other object of substantially constant diameter according to our method may be varied. For example, it should be apparent (without any separate drawing) that a readjustment of the two lateral spray devices 8 and 10 in Fig. 2 and of the rods supporting these devices will permit the sprays from these two devices to be either contiguous or in slightly overlapping relation, thereby making the traveling assemblage of Figs. 1 and 2 operatively a two-spray coating device. So also, it will be obvious that if the two lateral spray devices 8 and 10 are shut off, the same pipe-supported and pipe-guided assemblage will operate for projecting the coating material on the pipe in the form of a single stripe.

We claim as our invention:

The method of spray-coating an exteriorly cylindrical object which consists in supporting the object in a substantially horizontal stationary position; supporting upon the object an assemblage of spray-projecting devices having their axes converging radially of the object and in a common plane at right angles to the axis of the object, and having the sprays projected by the said devices slightly overlapping and conjointly covering a fraction of the circumference of the object, and projecting sprays from the said devices while moving the said assemblage longitudinally of the object for the entire length of the said object, and guiding the assemblage from the object to prevent movement of the assemblage rotationally of the object; raising the said spray device assemblage off the object; rotating the object while the said assemblage is thus raised, to present an uncoated pipe portion upwards, lowering the device assemblage again upon the object, and repeating the said guiding and moving.

Signed at Chicago, Illinois, February 11th, 1931.

SVEND BRAMSEN.
BERT R. SAUSEN.